United States Patent [19]
MacCulloch et al.

[11] Patent Number: 5,091,987
[45] Date of Patent: Feb. 25, 1992

[54] FIBER OPTIC HERMETIC CONNECTOR

[75] Inventors: David B. MacCulloch, Saugus; Nick C. George, Sherman Oaks, both of Calif.; Benjamin P. Brickett, Eliot, Me.

[73] Assignee: G & H Technology, Inc., Camarillo, Calif.

[21] Appl. No.: 653,410

[22] Filed: Feb. 11, 1991

[51] Int. Cl.$^5$ .......................... G02B 6/36; G02B 7/26
[52] U.S. Cl. ........................................................ 385/66
[58] Field of Search ............... 350/96.20, 96.21, 96.22

[56] References Cited
U.S. PATENT DOCUMENTS 4,553,812 11/1985 Kojiro et al. .................. 350/96.20
4,834,479 5/1989 Adl ................................ 350/96.20

Primary Examiner—William L. Sikes
Assistant Examiner—Robert E. Wise
Attorney, Agent, or Firm—Kenneth J. Hovet

[57] ABSTRACT

A fiber optic transmission line is passed uninterrupted through a hermetically sealed dielectric pressure barrier. This is accomplished by fusing glass or casting a resin about hollow upstanding sleeves within the bore of a connector housing. The glass forms a strong hermetically sealed barrier caused by strong compressive forces resulting from the different coefficients of thermal expansion between the metal bore walls and glass matrix. A fiber optic core is passed through a hollow sleeve and sealed to an aperture in a contact pin which is hermetically sealed to the end of the sleeve. The end of the pin is polished to provide an abutment joint with a corresponding contact surface on an associated connector. In the case of a resin matrix, the resin may be cast about the sleeves within the housing bore. During hardening, the resin will bond to the sleeves and walls of the bore to form a strong hermetically sealed pressure barrier.

18 Claims, 1 Drawing Sheet

FIBER OPTIC HERMETIC CONNECTOR

BACKGROUND OF THE INVENTION

1. Field of the Invention

The present invention pertains to fiber optic cable connections. More particularly, the invention relates to hermetically sealed connectors for fiber optic cables.

2. Description of Related Art

Most connectors for fiber optic cables include O-rings, gaskets and tightly interfitting mechanical structures. Such means are all designed to weatherproof and protect the integrity of the connection. However, there are only a few structures that allow a fiber optic cable to transmit signals across a barrier capable of withstanding high pressure differentials. The few devices that do permit such transmissions are oftentimes referenced as bulkhead penetrators. Examples of such devices are shown and described in U.S. Pat. Nos. 4,214,809; 4,296,996; 4,345,816; 4,469,399; 4,553,812 and 4,883,336.

Note that in each of the above patents, a connector assembly per se, is not shown. The fiber optic cables are not readily disconnectable from the penetrator assembly. In fact, many of the devices permanently embed a fiber strand in a plastic preform which is then sealed into the assembly. In U.S. Pat. Nos. 4,469,399 and 4,345,816, the strand is embedded in epoxy resin. In a somewhat similar fashion, 4,296,996 shows a plastic preform directly molded about the entire fiber optic cable. The cable and preform assembly are then positioned within corresponding openings in the wall of a pressure resistant housing. An overlay plug permanently fixes the assembly to the housing.

Precision openings in sapphire inserts are shown in U.S. Pat. No. 4,214,809. In this disclosure, the inserts are mounted in recesses formed in high pressure plugs on opposing sides of a bulkhead. The fibers closely fit through the openings and are sealed to the sapphire.

SUMMARY OF THE INVENTION

The present invention provides much of the high pressure capability of penetrator-type devices while having the significant advantage of being disconnectable. Further, the invention incorporates standard connector housings used with electrical cables. In fact, with the present invention, both electrical and fiber optic cables can be terminated in the same housing. Further, the invention is uncomplicated and inexpensive to construct and is adaptable for use both in outer space or deep sea applications.

The invention utilizes a receptacle housing having an axial bore hermetically sealed by a dielectric medium. Extending axially through the medium is a sleeve means comprising one or more hollow sleeves. Each sleeve has opposing open ends denoted as a contact end and an inlet end.

Secured to the contact end is a fiber optic contact means that includes a central opening. A fiber optic cable is positioned in the sleeve and the cable core is extended into the central opening. The sleeve, contact means, cable and core are all hermetically sealed to their respective adjacent parts so that the overall assembly is a very strong hermetically sealed unitary body.

The contact means includes an optical termination means which, in its simplest form, can comprise a polished planar surface. Such surface will mate with a corresponding surface in an associated optical termination means, such as a plug housing assembly, to form an optical abutment joint.

It can be seen that the above construction can accommodate multiple fiber optic contacts alone or in combination with conventional electrical contact members. The electrical contact members comprise elongated electrical contact pins which extend axially through the dielectric medium and are hermetically sealed in the same manner as the fiber optic sleeves.

DESCRIPTION OF THE PREFERRED EMBODIMENTS

Figure 2:
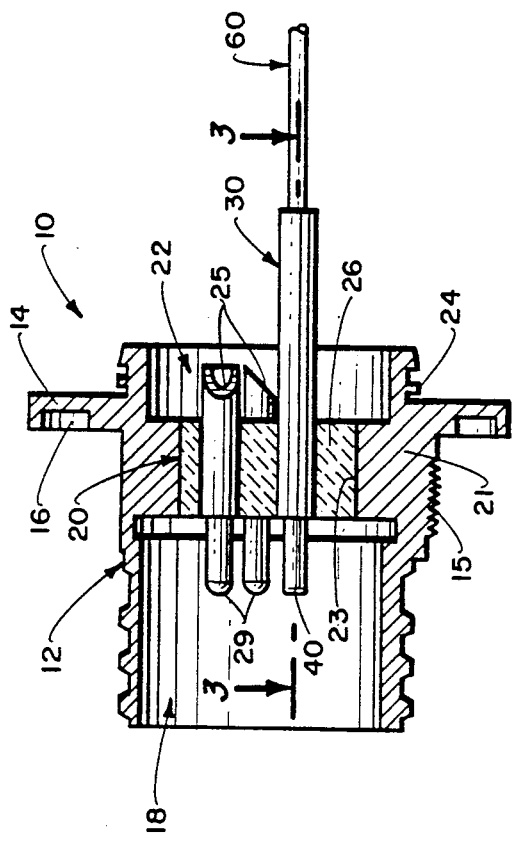
FIG. 2 is a cross-sectional view taken along lines 2—2 of FIG. 1.
Figure 1:
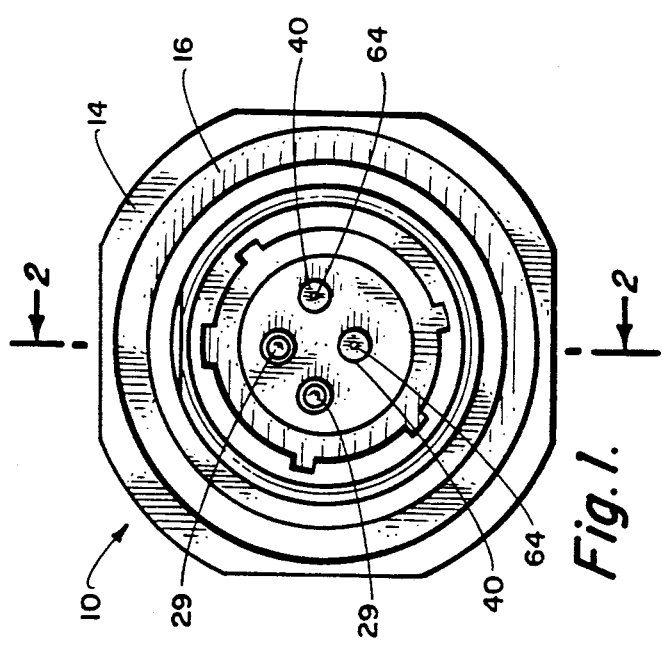
FIG. 1 is a left end elevational view of a fiber optic connector constructed in accordance with the present invention showing a combination of fiber optic and electrical contact pins.

With reference to FIGS. 1 and 2 of the drawings, the overall connector assembly is shown by reference 10. The assembly comprises a receptacle housing 12 having means for connection with a pressure barrier such as an instrument housing or bulkhead connection.

As shown, the connection means comprises a radially extending flange 14 and housing engagement threads 15. The threads are used with corresponding threads on a bushing (not shown) to tighten the flange against the exterior surface of the aforesaid instrument housing or bulkhead. The flange includes an annular recess 16 to accommodate a gasket or other desired sealing means.

The housing is constructed of a rigid corrosion resistant material and is preferably metal such as stainless steel or a titanium alloy. Its overall end view shape is generally round with profiled concentric circular interior surfaces. Such surfaces define a large contact cavity 18 adjoining a termination opening or axial bore 20.

The bore has a predetermined axial extent equal to about less than one half the housing length. Preferably, the bore has a smooth interior wall surface 23 with a diameter less than the diameter of contact cavity 18. It has a thickened wall 21 to provide a strong circumferential engagement force in a manner to be hereinafter described.

Axially rearward of the bore is a rear cavity 22. This cavity has less axial extent than the bore and contact cavity. Its outer surface includes annular rings 24 for facilitating attachment with cable accessory and protective means known art.

Entirely enclosing and heretically sealed to the inner wall 23, is a dielectric material or medium 26. Preferably, the medium has a thickness corresponding to the axial extent of the bore. It includes a contact face 27 and an outer face 28 which are generally perpendicular to the housing longitudinal axis.

As aforementioned, the medium may comprise a glass composition that is secured to the bore by compression forces emanating from housing wall 21. Alternatively, the medium may comprise a hardenable resin material capable of forming a strong adhesive bond with inner walls 23. Still further, the housing and dielectric medium may have similar thermal coefficients of expansion. In such cases, the medium and housing materials are selected to form a chemical bond with each other.

Extending axially through the medium are spaced-apart electrical contact members 25 and fiber optic sleeves 30. Both the fiber optic sleeves and electrical members are hermetically sealed to the medium by any of the aforementioned techniques and materials. As shown, the sleeves and contact members extend axially and coextensively with each other and are parallel to the longitudinal axis of bore 20.

The electrical contact members include axially extending termination pins 29 for connection with female contacts in a corresponding connector part (not shown). Such contacts and connector part are well known in the art and do not form part of the invention.

Figure 3:
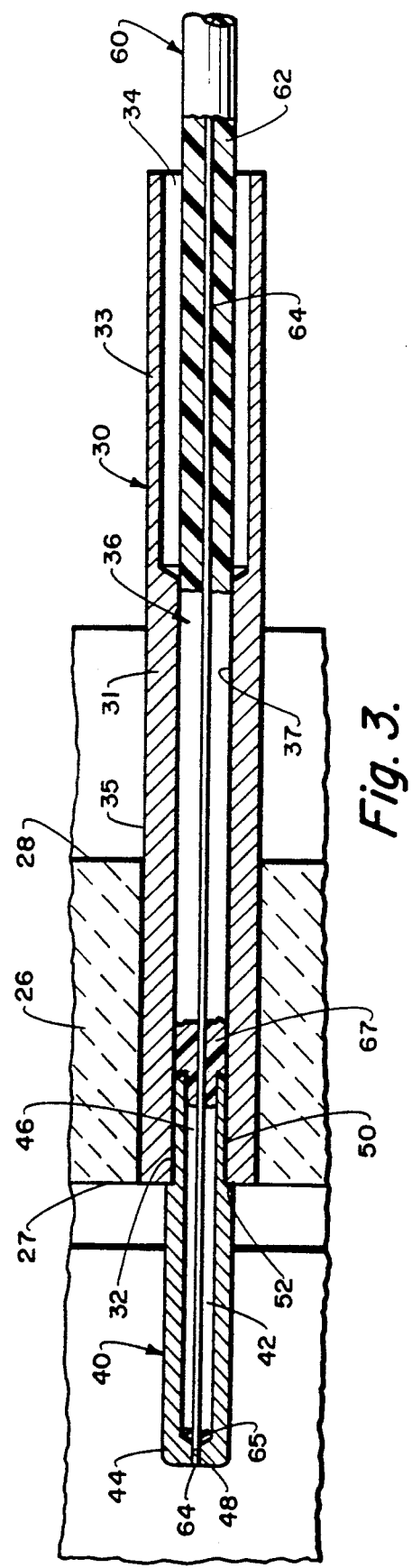
FIG. 3 is an enlarged fragmentary cross-sectional view taken along lines 3—3 of FIG. 2.

With particular reference to FIG. 3, it can be seen that fiber optic sleeve 30 has a hollow interior. It includes a thickened sleeve portion 31 extending along a major portion of its length. The thickened sleeve portion extends from an open contact end 32 rearwardly beyond its engagement with inner wall 23. It merges into a thin wall portion 33 which extends beyond rear cavity 22 to a cable inlet opening 34.

The sleeve comprises a strong rigid elongated body having an outer wall surface 35 capable of engagement with the dielectric medium. The contact end 32 is preferably even with the planar surface of dielectric contact face 27.

Enclosing the open contact end 32 is a fiber optic contact means shown as contact pin 40. The pin comprises a rigid tubular-shaped structure having an inner passage 42. The inner passage has a closed outer end 44 and an open insert end 46. The insert end is open to the interior 36 of fiber optic sleeve 30.

Extending through the outer end is a central aperture 48. The aperture communicates with inner passage 42 and is located at the center of the outer end. Preferably, its axis is colinear with the axes of inner passage 42 and sleeve interior 36.

The contact pin includes an engagement structure shown as a reduced diameter insert section 50. The insert section frictionally engages an upper inner portion of sleeve interior wall 37. The amount of axial engagement beyond open contact end 32 is determined by the location of abutment shoulder 52. The shoulder comprises a peripheral inwardly offset rim about the contact pin exterior and defines the beginning of insert section 50.

Extending into inlet opening 34 is fiber optic transmission cable 60. As is known in the art, the cable comprises an outer protective covering 62 and a central fiber core 64. It will be understood that the words "cable" and "core" as used herein, encompass all types of light guide means known in the art including non-fibrous light conductors and multiple strands of light conductors which may be clad together into a bundle to form a cable core.

As best shown in FIG. 3, a given length of the cable is stripped of its covering. This permits the core to be inserted through both the sleeve interior and inner passage and then through the central aperture 48. The aperture diameter closely matches the core diameter so that a very close fit will result. Minimizing void spaces facilitates the formation of a hermetic seal about the aperture.

The core is hermetically sealed and adhered to the aperture by core sealant 65. In a similar fashion, the pin insert end and core are hermetically sealed and bonded to sleeve interior wall 37 by an insert sealing material 67. Both the aforesaid sealant and sealing material preferably comprise epoxy resin compositions.

To further protect the core, the covering 62 will be snugly engaged against an annular section 70 of interior wall 37 proximate the transition between the thickened wall portion 31 and thin wall portion 33. An adhesive sealing material may also be used at this engagement.

Use of a contact pin, as shown, facilitates construction of a simple fiber optic joint known in the art. Illustrative of an abutment joint system suitable for use with the invention is set forth in U.S. Pat. No. 3,947,182.

Adapting the closed end of contact pin 40 into an optical face for use as an effective abutment joint, involves steps for construction of the overall connector. In the case of a glass dielectric medium, a glass preform material is obtained commercially with a specified diameter and thickness somewhat less than the diameter and axial extent of bore 20. The preform is drilled to accommodate the number, diameter and layout pattern of fiber optic sleeves--including any desired number of electrical contact members. The preform and sleeves are positioned upright within the vertically aligned bore of the receptacle housing. A carbon fixture is used to support the assembly at the desired elevation and alignment coextensive with the bore inner walls 23.

The above assembly is passed through a furnace and subjected to a temperature sufficient to melt the glass preform. The molten glass will expand against the bore wall and flow about all the upstanding sleeves and/or electrical members. Thereafter, the assembly is cooled to solidify the glass and contract the inner walls against the glass.

Due to the greater coefficient of thermal expansion of the metal housing compared to the glass material, great compressive forces will occur against the glass. This results in a hermetic seal that is capable of withstanding pressure differentials of at least 1000 psi with a hermeticity on the order of $10 \times 10$(to the minus six power) cc/sec.He.

With the glass medium and sleeves in place, covering 62 of cable 60 is removed to expose the fiber core. Sufficient covering is removed to allow insertion of the core through the sleeve interior and substantially beyond contact end 32. The core should extend a distance past the contact end to permit its insertion through the inner passage of contact pin 40 which, at this point, is loose and unattached to the sleeve.

The core sealant 65 is applied to the aperture which wicks by capillary action back into the aperture. Upon setting, the resin hermetically seals the voids and bonds the core to the aperture walls.

With the pin detached from the sleeve, any excess core extending beyond the aperture is severed at outer end 44. The end is then finely ground, if necessary, and polished to present a flat planar surface for abutment with a like surface extending from a corresponding connector part. Note that the polishing step is greatly facilitated by having the contact pin loose and out of the contact cavity.

Upon completion of the polishing step, the cable is drawn back from the sleeve inlet 34 until the fiber core pulls the pin insert section 50 into open contact end 32. Prior to the draw-back step, the contact end may be filled with insert sealing material 67. This allows the insert section to be sealed and bonded to end 32 and also encloses the pin insert end 46.

For many connector applications, it may be acceptable to replace the glass with a filled polymer or epoxy resin or other flowable hardenable plastic high strength material. In such cases, it is expected that the sleeves will be arranged in an appropriate die adjacent axial bore 20. The bore and die will comprise a mold for casting or injecting the settable material into the bore which will bond with the sleeves and with the bore inner wall 23. Such preassembly may then be used to construct the overall connector as previously delineated.

It can be seen that the use of sleeves in a hermetically sealed matrix, allows all types of light conductors to be used. The conductors are protected in the sleeves from extreme ambient conditions. Also, the invention is adaptable to other types of optical contact interfaces and a wide variety of overall housing constructions.

While the invention has been described with respect to a preferred embodiment, it will be apparent to those skilled in the art that various modifications and improvements may be made without departing from the scope and spirit of the invention. Accordingly, it is to be understood that the invention is not to be limited by the specific illustrative embodiments, but only by the scope of the appended claims.

WE CLAIM:

1. A receptacle for a fiber optic connector assembly comprising:
   a receptacle housing having an axial bore;
   a dielectric material of predetermined thickness overlying said bore and hermetically sealed thereto;
   an elongated hollow sleeve means extending through said thickness having a contact end opening;
   a fiber optic contact means hermetically sealed to said contact end opening, said contact means having a central aperture; and,
   a fiber optic cable having a light conductor that extends into said sleeve and is hermetically sealed thereto, said conductor extending though said aperture to provide a fiber optic connection with a corresponding means in said connector assembly.

2. The receptacle of claim 1 wherein said conductor is sealingly secured to said central aperture.

3. The receptacle of claim 2 wherein said contact means comprises a hollow contact pin with a closed outer end, said central aperture extending through said outer end.

4. The receptacle of claim 3 wherein said contact means provides an abutment joint with said corresponding means and said closed outer end comprises a polished flat surface with said conductor terminating substantially even with said surface.

5. The receptacle of claim 4 wherein said dielectric material has a contact face and an outer face, said sleeve extending axially from said contact face a predetermined distance beyond said outer face.

6. The receptacle of claim 1 including an elongated electrical contact member extending through said dielectric material to provide an electrical connection in combination with said fiber optic connection.

7. An optical fiber termination receptacle comprising:
   a receptacle housing having an inner wall surface defining a termination opening;
   a dielectric material hermetically sealing said opening having at least one sleeve with a contact end and an inlet end, said sleeve extending through said material and hermetically sealed to said material; and,
   a contact pin hermetically secured to said contact end having a central aperture through which extends a light conductor, said central aperture and conductor hermetically sealed to each other and formed into an optical termination means for optical feedthrough with a mating optical termination means.

8. The receptacle of claim 7 wherein said contact pin comprises a tubular-shaped structure having a closed end through which extends said central aperture.

9. The receptacle of claim 8 wherein said sleeve is an elongated tube with a longitudinal axis and said closed end is a planar surface perpendicular to said longitudinal axis.

10. The receptacle of claim 9 wherein said light conductor terminates about even with said planar surface.

11. The receptacle of claim 10 wherein said planar surface is polished to provide said optical termination means.

12. The receptacle of claim 8 wherein said contact pin includes a rear end opening which is enclosed and sealed with a flowable settable material.

13. The receptacle of claim 12 wherein said contact pin includes an insert section for engagement with said sleeve contact end.

14. The receptacle of claim 13 wherein said insert section comprises a reduced diameter portion of said tip which extends into said sleeve contact end.

15. A method of constructing a fiber optic connector comprising:
   providing a receptacle housing having an axial bore;
   positioning at least one elongated hollow sleeve having a contact end through said bore;
   filling said bore and surrounding said sleeve with a dielectric medium;
   forming a hermetic seal between said medium and said bore and said sleeves;
   providing a hollow fiber optic contact means which is engagable but apart from said sleeve contact end;
   providing a fiber optic cable with a light conductor;
   inserting a given length of said conductor through said sleeve and said contact means;
   hermetically sealing said conductor to said contact means;
   drawing said conductor back through said sleeve until said contact means engages said contact end; and,
   hermetically sealing said contact means to said contact end.

16. The method of claim 15 wherein forming a hermetic seal between said medium and bore and sleeve includes the steps of
   expanding said housing;
   fusing said medium within said bore;
   solidifying said medium; and,
   cooling said housing.

17. The method of claim 15 including the step of forming said contact means into an optical termination means before the step of drawing said conductor back through said sleeve.

18. The method of claim 15 wherein said medium is a flowable hardenable material and, forming a hermetic seal between said medium and bore and sleeve includes the steps of
   flowing said material into the area defined by said bore and around said sleeve; and,
   allowing said material to harden and bond with said bore and sleeve.

* * * * *